United States Patent [19]

Coakley et al.

[11] Patent Number: 5,215,135
[45] Date of Patent: Jun. 1, 1993

[54] PELLITIZER METHODS AND APPARATUS

[75] Inventors: Robert D. Coakley, Eugene, Oreg.;
Gerald M. Fisher, 1491 Greenwood
Ave., Palo Alto, Calif. 94301

[73] Assignee: Gerald M. Fisher, Palo Alto, Calif.

[21] Appl. No.: 895,605

[22] Filed: Jun. 8, 1992

[51] Int. Cl.⁵ .............................. B27L 5/02; B27M 1/02
[52] U.S. Cl. ....................................... 144/365; 144/213;
144/362; 144/367; 100/121; 492/35
[58] Field of Search ............... 29/121.6; 100/121, 176,
100/902; 144/209.2, 213, 362, 365, 367

[56] References Cited
U.S. PATENT DOCUMENTS 2,884,966 5/1959 Zilm .............................. 144/213 A
4,219,060 8/1980 Hasegawa ......................... 144/213
4,691,629 9/1987 Koba .............................. 144/362
4,790,360 12/1988 Clarke et al. ..................... 144/213
5,129,435 7/1992 Beuving et al. .................... 144/362
5,141,038 8/1992 Nakaya ........................... 144/213

Primary Examiner—W. Donald Bray
Attorney, Agent, or Firm—Gerald M. Fisher

[57] ABSTRACT

A new type of fuel pellet and method and apparatus for manufacturing. Pellets are cut directly from logs without requiring grinding and extruding. A veneer type lathe and rolls hold a log and the rolls incise the log surface to a depth larger than the veneer cut prior to cut off with the veneer knife so that all three dimensions of the pellet are precisely controlled as well as being clean cuts.

25 Claims, 6 Drawing Sheets

PELLITIZER METHODS AND APPARATUS

BACKGROUND OF THE INVENTION

This invention relates to the field of log processing equipment and particularly to a new type of fuel pellet manufacturing process and equipment.

In recent years a new type of residential wood pellet burning stove is becoming popular around the world. These pellet stoves provide a number of significant advantages over previous fiber fuel stoves including a low rate of particulate emissions, high energy efficiency, cleanliness and general convenience of use. Many localities in which air quality has become a serious problem in winter such as in the northwestern states of the United States have passed stringent air quality legislation which has increased the demand for pellet stoves.

In the past, the pellet fuel for these pellet stoves has been produced by grinding saw mill residues and compressing the ground material at high pressures like 20,000 psi through extrusion dies forming small cylindrical pellets having a diameter around 9/32 inch and less than 1.5 inches in length. In recent times, there is less saw mill residue available and the cost of raw material for pellets has increased. Accordingly, pellet manufacturers have begun chipping trees for their raw material and grinding the chips.

The capital investment in pellet equipment to establish a pellet mill is over $1 million 1992 U.S. dollars. Also, pellet mill operating costs add significantly to pellet costs because of the large amount of power required for grinding and heating with steam and compression.

There is another type of wood processing equipment for fuel known as a hog. This machine typically includes a number of large interleaving hooks which rotate together with tremendous torque and which clamp onto a wooden piece and crush and break it as the hooks pass by one another. After the crushing, the material is ground up and separated by screens into sizes desired. This is a low production rate operation and is generally used in conjunction with waste lumber less than 4 inch diameter. This type of processing is used to prepare fuel called "hog fuel" for commercial boiler operation.

There is still another type of wood processor known as a chipper which is sometimes used for processing fuel. In general, most chippers are used to make thin chips which are used in paper manufacture. The prior art chippers are generally divided into two classes. The first type employs a massive large diameter disk which is rotated at high torque and velocity about its axis and which has a plurality of radially mounted knives protruding from the face of the disk. Appropriately these prior art devices are known as disk chippers. In these devices the material to be chipped is presented to and pressed against the face of the disk at various angles and at various positions with respect to the center of the disk. These devices only accurately control two dimensions of the chip they produce. The width of the chip is controlled by the height that the knife protrudes above the face of the disk and the thickness of the chip is determined by the feed rate of the work piece. The third dimension of the chip is determined by the grain lines of the wood and the angle and path of the knife impact. Typically the third dimension is between 1 to 2 inches. In the paper industry, the chip length is not a critical dimension. Cutting directly across the grain by feeding the work place into the disk perpendicularly to the face of the disk is avoided because of the fragmentation of the wood along the grain lines.

Another form of chipper machine is in current use. This one employs a large diameter hollow cylinder and is called a Lily Pad chipper, a name which it has acquired because its primary use has been in chipping log ends which are called Lily Pads. In this chipper, a plurality of short knives are mounted around the periphery of the cylinder. The work place which is shorter than the diameter of the cylinder gets jammed down between one side of the cylinder and a side wall where it is chipped away by the approximately 2 inch knives which have their leading edge parallel to the axis of the cylinder. This chipper also has no control over the length of the chip. The other two dimensions are fixed by the height of the knife above the cylinder and the length of the knife.

Both of these prior art chippers are designed for handling large diameter fir logs and they are accordingly large and expensive devices. The disk chipper is capable of a higher production rate which derives from the fact that several knives across the entire log diameter make a full cut for each revolution. In the lily pad chipper only one knife hits the log at any axial position for each revolution of that chipper.

The disk chipper has been made in both a portable and stationary variety. The portable device can go directly into the forest and permits some reduction in the handling and transportation expenses. The costs of logging and chipping for a team of 3 loggers and 2 equipment drivers is about $600 per hour in 1991 dollars. This implies the smallest diameter trees which are economical to chip knowing the feed rate of the apparatus for any given diameter. In 1991, the economic break even point for a logging operation in Oregon was approximately an 8 inch diameter tree. This has resulted in cessation of harvest activities for large forest areas in which a high percentage of the ground coverage is less than 8 inches in diameter. It is a fact that there is as much total fiber content in a forest which has not been thinned or otherwise cultivated as in a cultivated forest having stands of large trees. Accordingly, there is a very large acreage of species of hardwoods, such as madrone and white oak in the world which are not lumber or paper chip resources but could be resources for pellet fuel if production costs were reduced to permit their economic utilization.

In view of the above, there is a long felt need for a less expensive means to utilize available hardwood which is now being ignored because it is too expensive to produce. Also, there is a growing worldwide recognition that dwindling petroleum resources need to be conserved and that renewable resources should be more fully employed as long as air quality standards can be maintained. The residential pellet stove is a good answer to these problems and the market for wood fuel pellets has been growing faster than the supply. The design of pellet stoves vary, but most systems employ a gravity feed pellet bin and an auger fuel feeder. In order to flow properly in the feed bin, the pellet must be smooth enough on its exterior to slide or it will hang up. Also, the pellet cannot be shaped like a match stick or it will bridge over the auger entrance, or jam the auger by getting stuck in the auger side clearance.

It is an object of our invention to provide machinery requiring less capital investment and which is less expensive to operate to manufacture fuel pellets and to enable use of fiber resources which are abundantly available but which heretofore have had little commercial use.

It is another object to reduce pellet manufacturing costs by providing apparatus to directly manufacture such pellets from a log without the requirement to first reduce the log to chips which then need to be finely ground and extruded at high temperature and pressure.

It is still a further objective to provide a machine which is able to process both hardwood and softwood small diameter logs directly into pellets without the shattering and fragmenting which accompanies chipping and with minimal residual unavailable fiber and with essentially no waste or kerf.

It is a still further objective to provide a machine design which is simple and which can be made portable for in-forest operations.

It is a still further object of our invention to provide a solid wood pellet having a smooth exterior which will flow easily in a gravity feed pellet bin and which will not bridge over or jam in the pellet stove auger.

SUMMARY OF THE INVENTION

A pellet manufacturing method and machine using a veneer lathe type machine having full log length backup rolls which rolls cooperate to incise the surface of the log prior to cut off with the veneer knife where the incisions are to a depth which is equal to or greater than the depth of cut with the veneer knife.

Alternatively, the veneer sheet can be made in a normal manner and then operated on by a pair of rolls having incisors which cut the sheet into pellets.

DETAILED DESCRIPTION OF THE INVENTION

Figure 1:
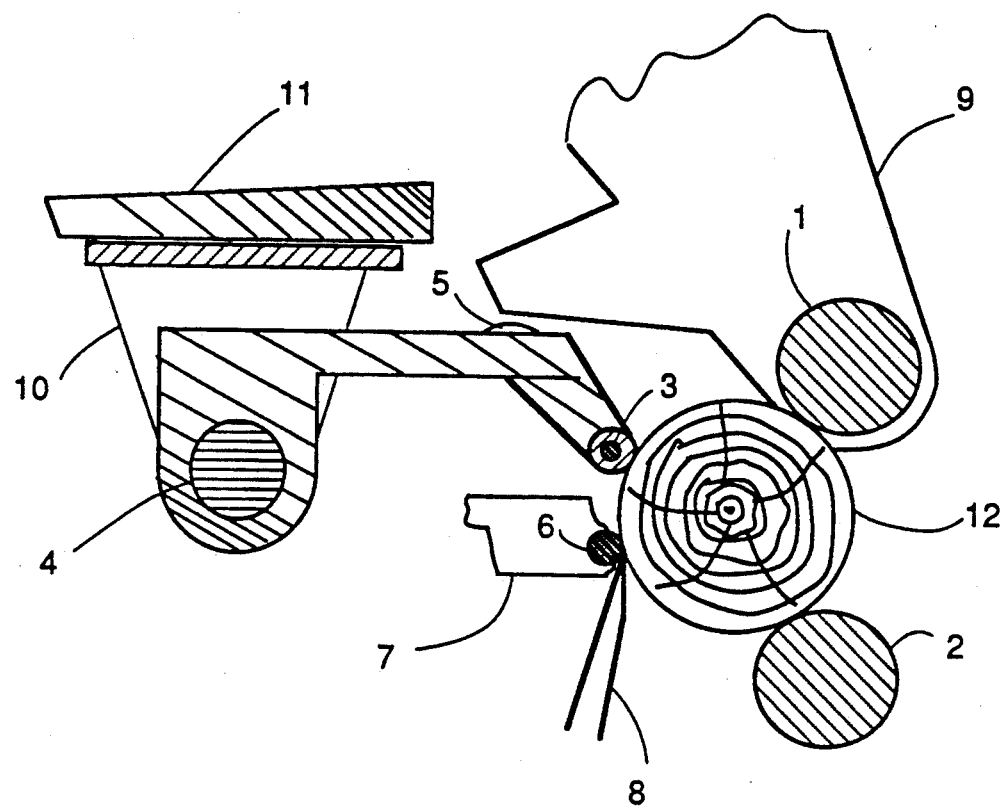
FIG. 1 is a sectional view of the portion of the inventive veneer lathe machine showing the veneer knife and the log support and rollers.

With reference to FIG. 1, the prior art veneer lathe cross section is illustrated showing rolls 1, 2, and 3 and nose bar roll 6 cooperating to support a log 12. Backup rolls 1 and 2 are supported by hydraulically controlled arms 9 to compress the log against the roll 3 and the nose bar roll 6. As the diameter of the log decreases, arm 9 is moved closer to the veneer knife 8 and arm 9 also drives the support arm for roll 3 via contact 5 to rotate on axis 4. In order to cut a slice, the roll 1, or both roll 1 and 2, can be driven via motors connected via a transmission (not shown) to axis 20 and 22 to force the log 12 to rotate CCW for the FIG. 1 configuration. The distance of the knife edge 8 from the nose bar 6 determines the thickness of the slice. This veneer lathe apparatus is known, as for example, U.S. Pat. No. 4,073,326 where the torque to drive the log is provided entirely by the backup rolls 1, or 1 and 2. In U.S. Pat. No. 4,380,259, the backup rolls are powered but the end spindles also provide torque.

We have made a conceptually simple change to the veneer lathe which enables us to provide a compact, relatively inexpensive machine for high rate pellet production with no waste which is able to be built in portable sizes for forest applications.

Figure 2A:
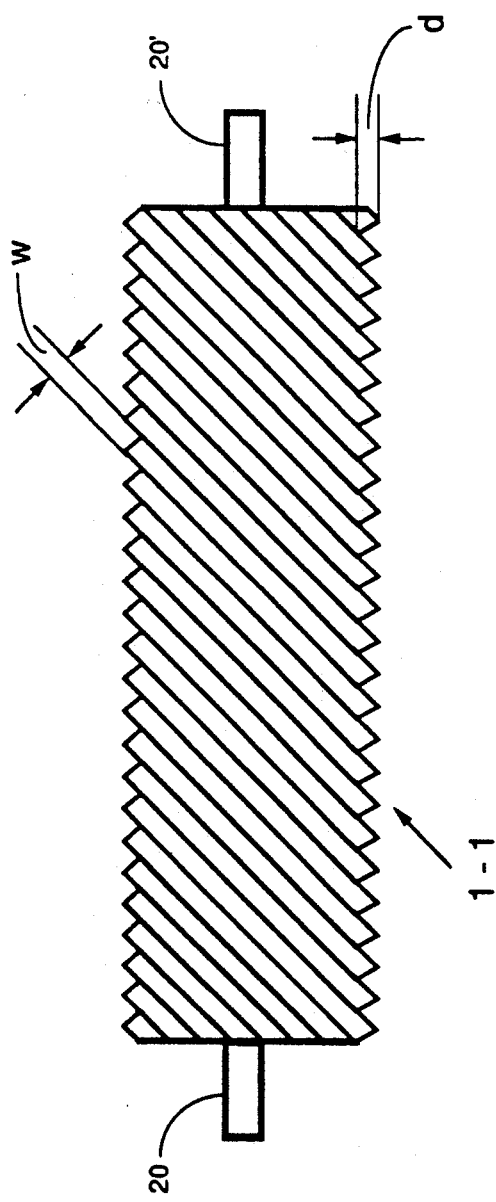
FIG. 2A is top plan view of the preferred upper drive roll with right hand type helix grooves viewed from the left.
Figure 2B:
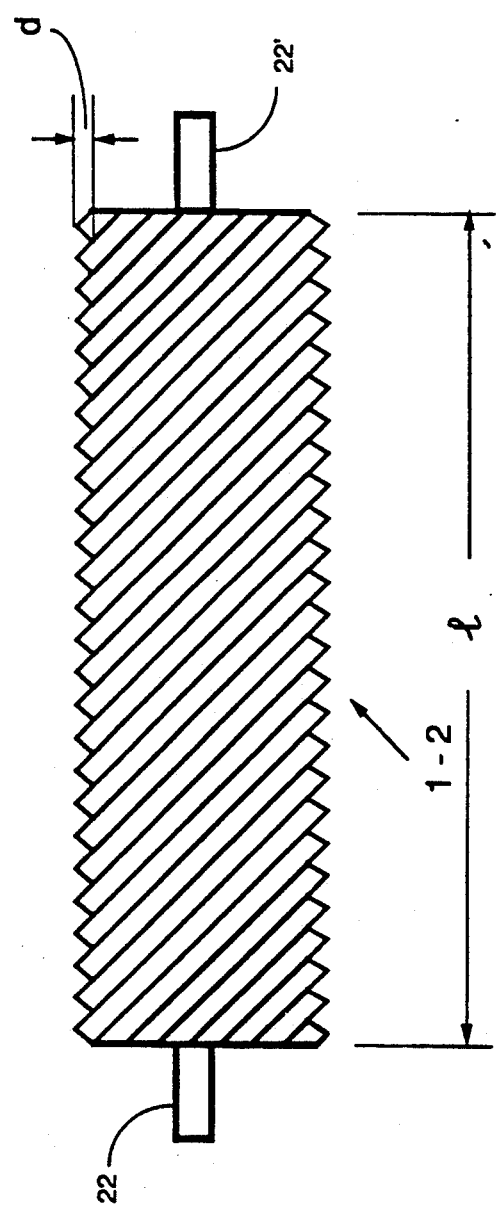
FIG. 2B is a top plan view of the preferred lower drive roll with left hand type helix grooves viewed from the left.

We have replaced the drive rolls of FIG. 1 with the drive rolls 1-1 of FIG. 2A and roll 1-2 of FIG. 2B. Both of the rolls 1-1 and 1-2 could be drive rolls or one could be an idler roll. The rolls are machined to have sharp surface edges which will cut through the surface of the log as they are compressed into and drive the log. In the case of an idler roll, it simply supports the log but will incise the log under the compressive force accompanying the rotation.

As shown, the spiral on rolls 1-1 and 1-2 in FIG. 2A and FIG. 2B are in the opposite sense so that they will cut intersecting grooves in the log. Preferably the distance "W" on one roll and "t" on the other roll are equal, although this is not necessary. W and t will control two of the dimensions of the final pellet. The pitch of the groove, i.e., number of grooves per inch, will effect the efficiency at which the rolls function as drive rolls. If both rolls are used as drive rolls then the pitch should be about 45 degrees for equal drive roll efficiency. The depth of the groove is critical for this embodiment of the invention and must be able to incise to a depth which is as deep or deeper than the depth that the veneer knife is set to cut. In the preferred embodiment, $W=t=0.5$ inches and $d=0.30-0.35$ inches for a depth of veneer cut of 0.25 inches.

This procedure and apparatus will cause the pellets to be separated immediately into cubes $\frac{1}{4}'' \times \frac{1}{4}'' \times \frac{1}{4}''$ by the veneer knife as they are cut off from the log. The length of the rolls need to be longer than the log so that the entire log is uniformly reduced in diameter by the process.

Figure 4A:
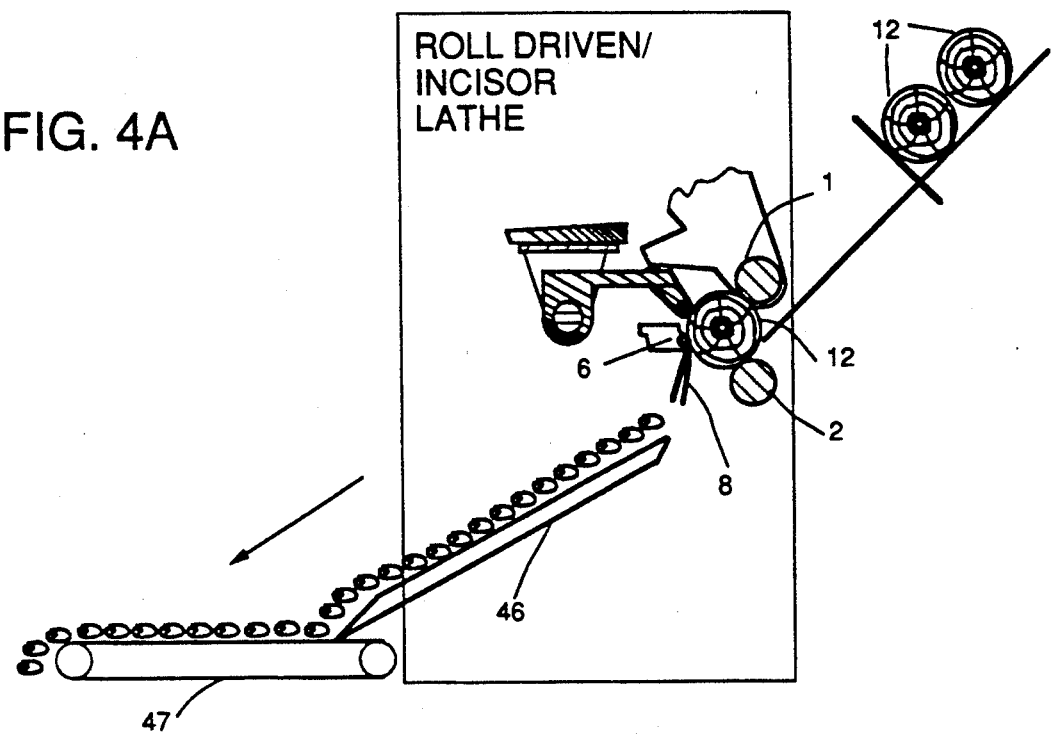
FIG. 4A is a block diagram of the perferred pelletizing method employing a veneer lathe having incissor backup drive rolls.

The preferred veneer lathe apparatus is the backup drive roll configuration of FIG. 1 and FIG. 4A because it permits cutting the log to a smaller diameter since there are no end drive spindles which need to be avoided as the diameter of the log is reduced. Also, the veneer machine is reduced in weight and expense when the log drive spindles and the apparatus in support of those functions are eliminated. We have shown an inverted knife location from that in U.S. Pat. No. 4,073,326 because the produced pellets will gravity feed directly away from the machine without interference problems from the pellets getting between the nose bar and the log as they would do if the veneer knife were above the nose bar as in the prior '326 configuration.

Figure 3A:
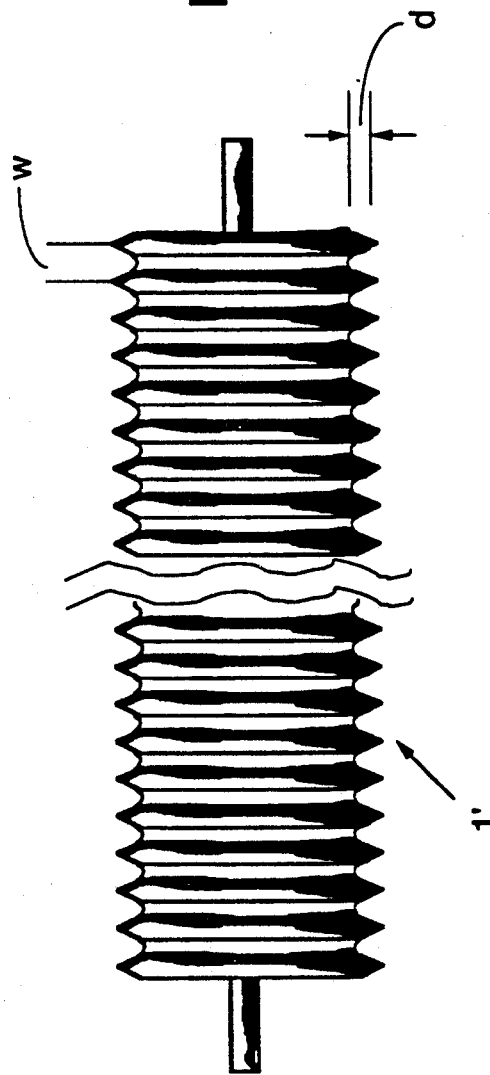
FIG. 3A is a top plan view of an alternative upper idler roll with zero pitch grooves.
Figure 3B:
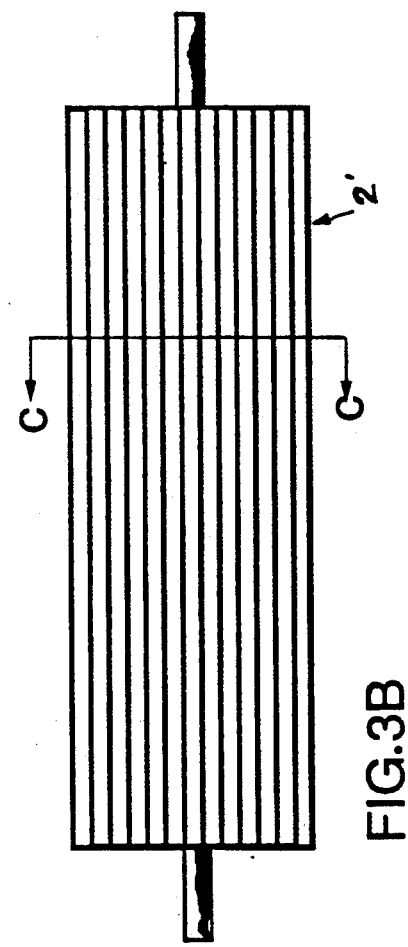
FIG. 3B is a top plan view of an alternate lower drive roll with axially aligned grooves.
Figure 3C:
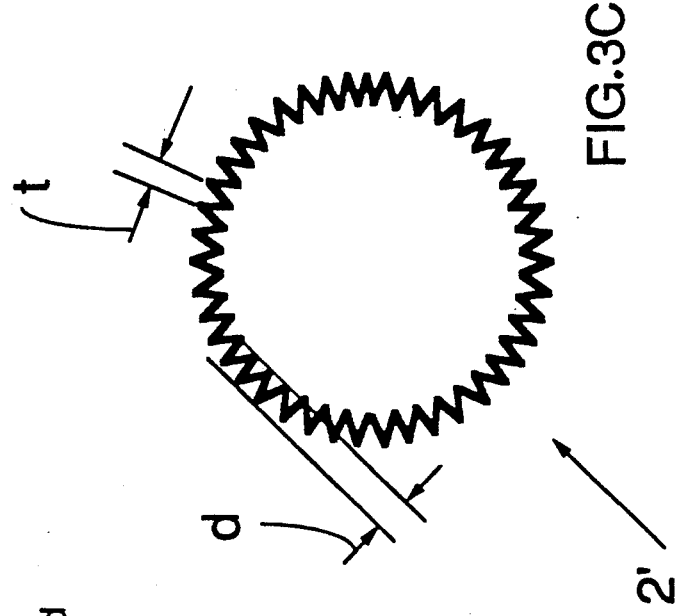
FIG. 3C is a cross section of the roll of FIG. 3B.

With reference to FIG. 3A and 3B, we disclose alternative embodiments for the drive-incisor roll 2' and idler roll 1'. These two rolls combine to produce intersecting cuts in the periphery of the log in the same way as 1-1 and 1-2. However, if only one drive roll is used, it would be more efficient to employ this roll groove configuration since the roll of FIG. 3B will be the most efficient torque transfer drive roll than all the other configurations. Alternatively, the idler roll of FIG. 3A can be replaced by a plurality of fixed spur knives to cut into the log surface. The dimensions W and t control two dimensions of the pellet and the third dimension is controlled by the veneer knife depth so long as the incising groove depth "d" is deep enough to exceed the veneer depth to ensure separation.

U.S. Pat. No. 4,790,360 describes rolls for incising plywood for flexibility in an incising machine and also discloses use of an incisor roll on a nose bar of a veneer lathe. These rolls are all made with intersecting grooves on a single roll. Accordingly, the '360 rolls could not be used for pellet incising or control of the dimensions of a pellet. The incising rolls of '360 patent are not intended to create separated pellets.

Although the embodiments described herein include the cutter rolls on the veneer lathe for patterning the log before the lathe cut is made, it is not necessary to perform the invention in this manner. For example, the veneer could be cut from the log in a normal way and thereafter the veneer could be passed through a pair of opposed cutter rolls where one roll has right and the other left hand spiral grooves resulting in pellets which are dimensional as defined above.

Figure 4B:
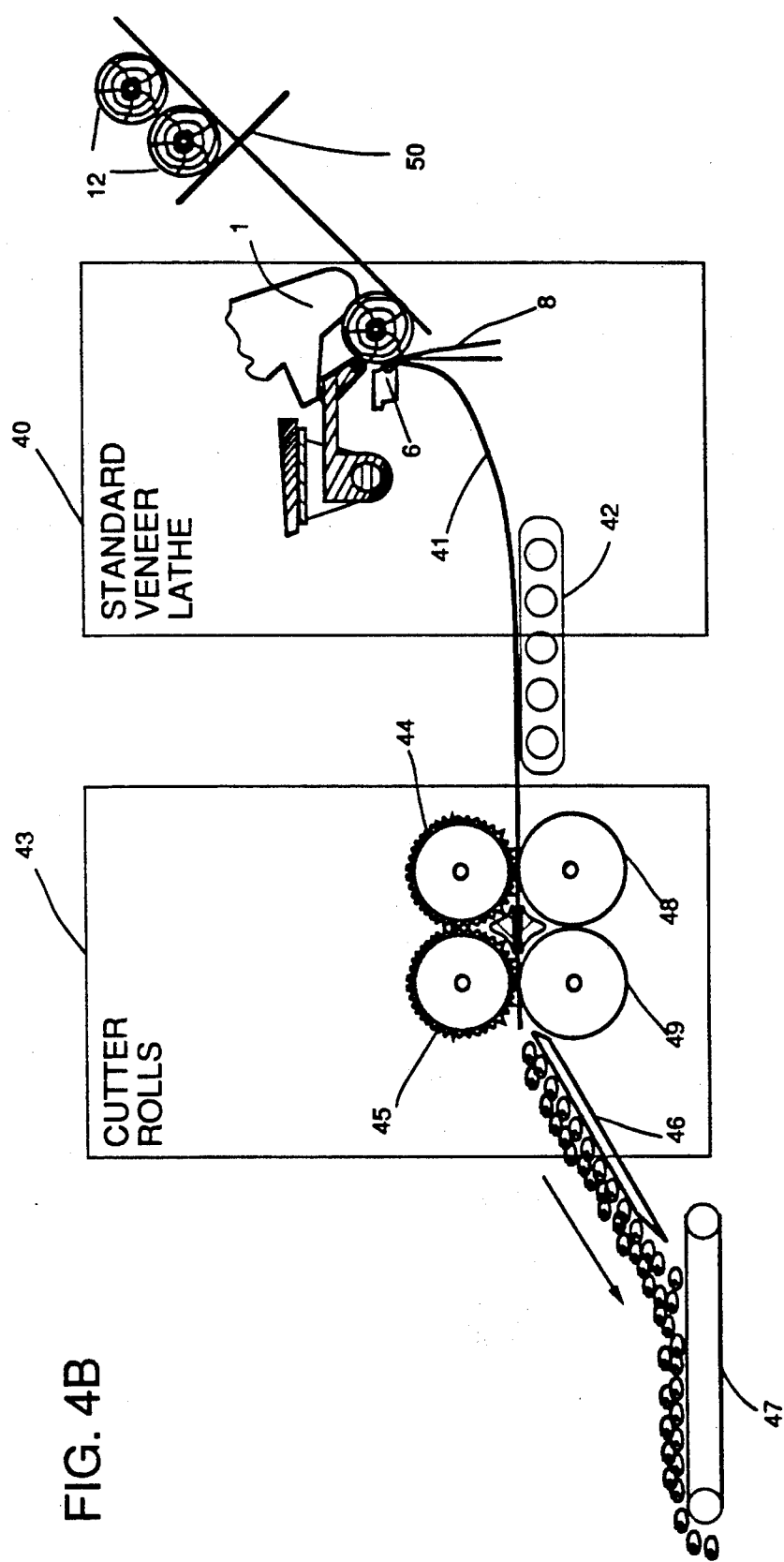
FIG. 4B is a block diagram of an alternative pelletizing method employing a standard veneer lathe and a separate machine having a pair of incisor rolls wherein the incisor rolls cut the veneer sheet into pellets.

This process is described in FIG. 4B. As shown, logs 12 are fed into a standard veneer lathe 40 where it is cut to a thin veneer capable of being cut into pellets. Next, the veneer sheet 41 is guided on rollers 42 to a cutter roll machine 43. Roll 44 and 45 interact with the veneer sheet 41 against a smooth backup roll 46 and 47 respectively. The rolls 44 and 45 can have any groove configuration similar to FIG. 2A; FIG. 2B; FIG. 3A and FIG. 3B, although FIG. 3A will not provide drive. Cutter roll machine 43 also provides drive forces to the rolls and compressive forces to complete cut-off and separation of all the pellets. The pellets feed out of the cutter machines via gravity feed 46 to a conveyor 47.

Figure 5A:
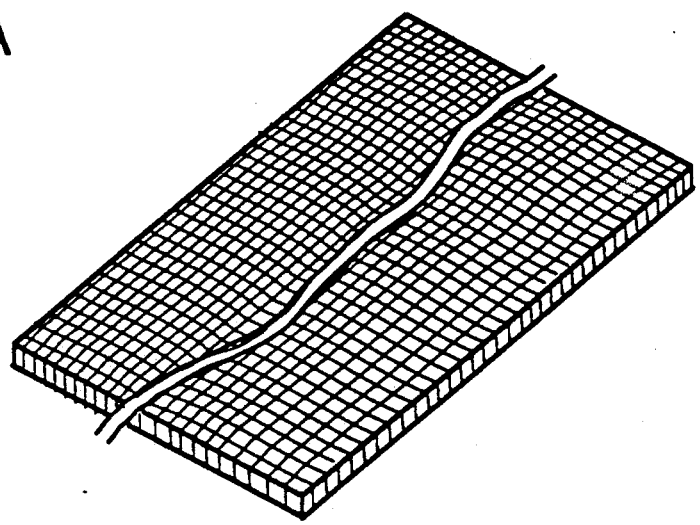
FIG. 5A is the right angle pellet pattern created by rolls having groove configuration of FIG. 3A and FIG. 3B.
Figure 5B:
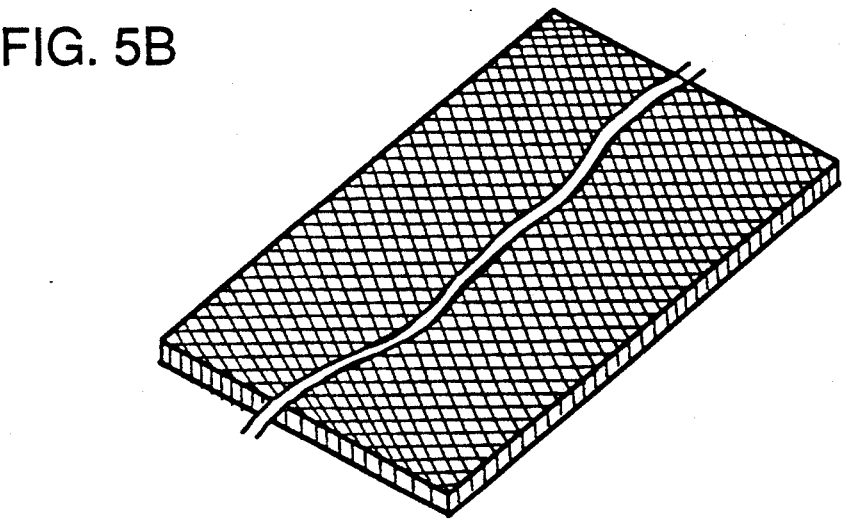
FIG. 5B is the diagonal pellet pattern created by rolls having the groove configuration of FIGS. 2A and 2B.

FIG. 5A illustrates the pellet configuration as cut into a veneer sheet by the rolls of FIG. 3A and FIG. 3B. FIG. 5B illustrates the pellet configuration using rolls of FIG. 2A and FIG. 2B.

Since the chips produced by prior chippers are coarse and uncontrolled dimensionally, they have not been able to be used in pellet stoves. Small match stick or tooth pick size splints either arch over the auger input or jam in the auger clearance. Accordingly, the three dimensional chip control made possible by this method and apparatus have produced a new pellet which will work efficiently in the existing pellet stoves because of its smooth exterior surfaces. Since each surface is produced by a slicing knife action, as opposed to a sawing or clipping action, the pellet so produced has favorable characteristics for this application.

The rolls of this invention are preferably made of high strength bars or tubes of tool steel, and can be coated with tungsten or chrome for longer wear, or hardened by ion bombardment with nitrogen ions.

This invention has been described in terms of the drawing herein. It is not the intention that our invention be restricted to the illustrated embodiment but rather the scope of the invention should be determined by the claims.

With this in view,

What is claimed is:

1. A new method of using a veneer lathe to directly make fuel pellets from a log without intermediate milling comprising
   (a) defining a first dimension of said fuel pellet by cutting a veneer from said log of a thickness equal to said first dimension; and
   (b) defining the dimensions of the cross section of said fuel pellet, which cross section is perpendicular to said thickness dimension of said pellet by cutting said cross section dimensions to a depth at least equal to or greater than said first dimension.

2. The method of claim 1 wherein
   step (b) is performed before the veneer is cut from said log.

3. The method of claim 1 wherein step (b) is performed after the veneer is cut from said log.

4. The method of claim 3 wherein step (b) is performed by a pair of incisor rolls which have helical grooves cut into their surface and which are compressed against said veneer and cut the said cross sections of said pellets through said veneer.

5. The method of claim 2 wherein step (b) includes cutting said cross sectional dimensions of said pellet into said log while said log is being rotated.

6. The method of claim 5 further comprising the step of supporting and compressing said log in said veneer lathe between three rolls.

7. The method of claim 6 wherein at least one of said three rolls is a drive roll and wherein at least one of said three rolls has a helical groove cut into said drive roll cylindrical surface forming a helical high edge, such that said high edge of said roll surface is sharp and, in operation, said high edge cuts into said log to the depth of at least said first dimension.

8. The method of claim 7 wherein at least two of said rolls have said helical grooves cut into the surface of said rolls, one of said rolls having a right hand helical groove and the other having a left hand helical groove such that, in operation the high edges of the said two rolls make intersecting cuts into said log to the depth of at least said first dimension.

9. The method of claim 8 wherein both of said rolls having helical grooves are drive rolls.

10. The method of claim 7 wherein step (a) comprises driving said log for cutting a veneer without the assistance of a pair of log ends drive spindles.

11. A machine for making wooden fuel pellets directly from a log comprising:
    a veneer lathe including a veneer knife, a nose bar roll, an first and second backup roll;
    means to support said knife and said rolls and means to compress and support a log held between said rolls;
    said first backup roll having a surface for contacting said log;
    a helical groove cut into said surface of said first backup roll, the high points of said groove being sharp enough to cut into a log compressed between said rolls, said groove in said first backup roll being deep enough to ensure that the cuts into said logs are as deep as the thickness of the veneer cut.

12. The machine of claim 11 wherein both said first and second backup rolls have helical grooves cut into their said surface, the helical groove cut into one of said backup roll being a left hand thread and the helical groove cut into the other one of said backup roll being a right hand thread.

13. The machine of claim 11 wherein one of said backup rolls is a drive roll.

14. The machine of claim 13 wherein said drive roll is said first backup roll.

15. The machine of claim 12 wherein both said backup rolls are drive rolls.

16. The machine of claim 13 wherein the said backup rolls extend the full length of said veneer knife; and the said veneer lathe does not include spindle centering, clamping log end drive means whereby the log can be driven exclusively by said backup drive roll and said log can be reduced to a smaller diameter than possible in a machine having a log end drive.

17. A machine for making wooden fuel pellets directly from logs without milling and without forcing a milled product through dies comprising a veneer lathe including a veneer knife, a nose bar roll, first and second backup roll; means to support said knife and said rolls to compress and support a log, in operation, held between said rolls;

said first backup roll having a surface for contacting said logs, said backup roll surface having axially aligned grooves cut therein, the high points between said grooves being sharp enough to cut into contacting surfaces of logs compressed between said rolls, said grooves being at least as deep as the thickness of veneer to be cut.

18. The machine of claim 17 including a plurality of spur knives, said spur knives being mounted to said lathe to slice cuts into said log perpendicular to the axis of said logs while said log is being rotated.

19. The machine of claim 17 wherein said backup roll is a drive roll.

20. The machine of claim 19 wherein said drive roll drives, in operation, a log without any end spindle drive assistance.

21. The apparatus of claim 17 where said veneer knife is mounted adjacent said nose bar.

22. A new method of using a veneer lathe to cut pellets from a log including the steps of:

(a) grasping and rotating a log to be pelletized in said veneer lathe;

(b) incising the outline of said pellet to be cut into said log periphery to a depth at least equal to the veneer knife cut; and (c) driving said incised log into said veneer knife;

(d) cutting of said outlined pellets from said log.

23. A pellet having an exterior smoothness on the order of the smoothness of an extruded pellet, said pellet being made by the process of claim 21.

24. A pellet made by the process of claim 2.

25. A pellet made by the process of claim 1.

* * * * *